US006960137B2

(12) United States Patent
Nishizawa et al.

(10) Patent No.: US 6,960,137 B2
(45) Date of Patent: Nov. 1, 2005

(54) SOUND CONTROL METHOD AND DEVICE FOR EXPRESSING GAME PRESENCE

(75) Inventors: Manabu Nishizawa, Tokyo (JP); Takayuki Wakimura, Kanagawa (JP); Fumiteru Sato, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 432 days.

(21) Appl. No.: 10/013,820

(22) Filed: Dec. 11, 2001

(65) Prior Publication Data

US 2002/0098886 A1 Jul. 25, 2002

(30) Foreign Application Priority Data

Jan. 19, 2001 (JP) ........................................ 2001-012356
Oct. 26, 2001 (JP) ........................................ 2001-328998

(51) Int. Cl.[7] ................................................ A63F 13/00
(52) U.S. Cl. ............................................. 463/35; 463/1
(58) Field of Search ................................. 463/1, 30–35; 381/309–310, 27

(56) References Cited

U.S. PATENT DOCUMENTS

| 5,052,685 | A | * | 10/1991 | Lowe et al. ................... 463/35 |
| 5,459,790 | A | * | 10/1995 | Scofield et al. .............. 381/310 |
| 5,556,107 | A | | 9/1996 | Carter |
| 6,241,612 | B1 | * | 6/2001 | Heredia ........................ 463/42 |
| 6,529,875 | B1 | | 3/2003 | Nakajima et al. |
| 6,544,122 | B2 | * | 4/2003 | Araki et al. ................... 463/35 |

FOREIGN PATENT DOCUMENTS

| EP | 0 850 673 | 7/1998 |
| EP | 1 128 706 | 8/2001 |
| JP | 8-47081 | 2/1996 |
| JP | 11-178090 | 3/1999 |
| JP | 11-215596 | 8/1999 |
| JP | 2000-014929 | 1/2000 |
| JP | 2000-140443 | 5/2000 |
| JP | 2000-347558 | 12/2000 |

OTHER PUBLICATIONS

Shoji Shimada. A Trend for Sound Communication Technology in the Near Future. The Institute of Electronics Information and Communcation Engineers. pp. 37–44.
Notification of Reasons for Refusal Dated Apr. 19, 2004.

* cited by examiner

*Primary Examiner*—Kim Nguyen
(74) *Attorney, Agent, or Firm*—Katten Muchin Rosenman LLP (57) ABSTRACT

The game sounds were classified into those emitted from left and right speaker units of a television receiver and those emitted from a head set worn by a player, and emission of the individual game sounds from the speaker units or a sound emissive portion of the head set is controlled corresponding to game screens or scenes. This allows the player to enjoy the video game while hearing footstep or whispering of the leading character closely from the head set, and hearing explosive sound or shout of the enemy characters distantly from the speaker units.

13 Claims, 5 Drawing Sheets

SOUND CONTROL METHOD AND DEVICE FOR EXPRESSING GAME PRESENCE

This application is related to Japanese Patent Application No. 2001-12356 filed on Jan. 19, 2001, and No. 2001-328998 filed on Oct. 26, 2001, based on which this application claims priority under the Paris Convention and the content of which is incorporated herein by reference.

BACKGROUND OF THE INVENTION

1. Field of the Invention

The present invention relates to a sound control device, a sound control method, a computer-readable storage medium having recorded therein a sound control program to be executed on a computer, a program execution device for executing the sound control program and a sound control program to be executed on a computer; all of which are preferably applicable to video game machines and entertainment systems having video game function.

2. Description of the Related Art

In recent years, there is widely popularized an video game machine for executing a video game based on a game program which is stored in a storage medium such as CD-ROM, DVD-ROM and semiconductor memory.

Such video game machine is designed to allow a player to manipulate a game character that appears on a display screen through operating a controller plugged into the main unit of the video game machine. Thus the player can enjoy a variety of video games including RPG (Role Playing Game) AVG (Adventure Game) and SLG (Simulation Game).

Most of recent video games are designed in pursuit of reality and presence, and various efforts have been made from the graphical aspect typically by applying three-dimensional computer graphics technology.

Most of such efforts for adding reality and presence of video games, however, have placed an emphasis on the visual aspect of the player such that illustrating more realistic characters and objects of the game, and have placed only a little emphasis on the auditory aspect of the player up to now.

Generation and emission of more real game sounds would be one possible measure for improving reality and presence of video games to a certain extent, but as far as television receiver is used as a monitor device, all game sounds such as characters' voices or effective sounds are audible from fixed speaker units provided as a sound emitter of the television receiver.

So that the emitted sound had difficulty to have perspective, which has resulted in limited reality and presence of video games.

SUMMARY OF THE INVENTION

The present invention was proposed to address the foregoing problem, and an object thereof resides in that providing a sound control device, a sound control method, a computer-readable storage medium having recorded therein a sound control program to be executed on a computer, a program execution device for executing the sound control program and a sound control program to be executed on a computer; all of which are aimed at providing perspective to the emissive sound and improving reality and presence of video games.

In the present invention, emission of predetermined sounds such as effective sound and a background music of the game, among whole sounds related to a video game, are controlled through the first sound emissive unit provided at a predetermined distance from a player, and emission of sounds other than the above, such as characters' voices, are controlled through the second sound emissive unit provided close to a player's ear, to thereby ensure perspective of the game sounds and thus improve reality and presence of the game.

Further particular and preferred aspects of the present invention are set out in the accompanying independent and dependent claims. Features of the dependent claims may be combined with features of the independent claims as appropriate, and in combinations other than those explicitly set out in the claims.

DETAILED DESCRIPTION OF THE PREFERRED EMBODIMENTS

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

Figure 1:
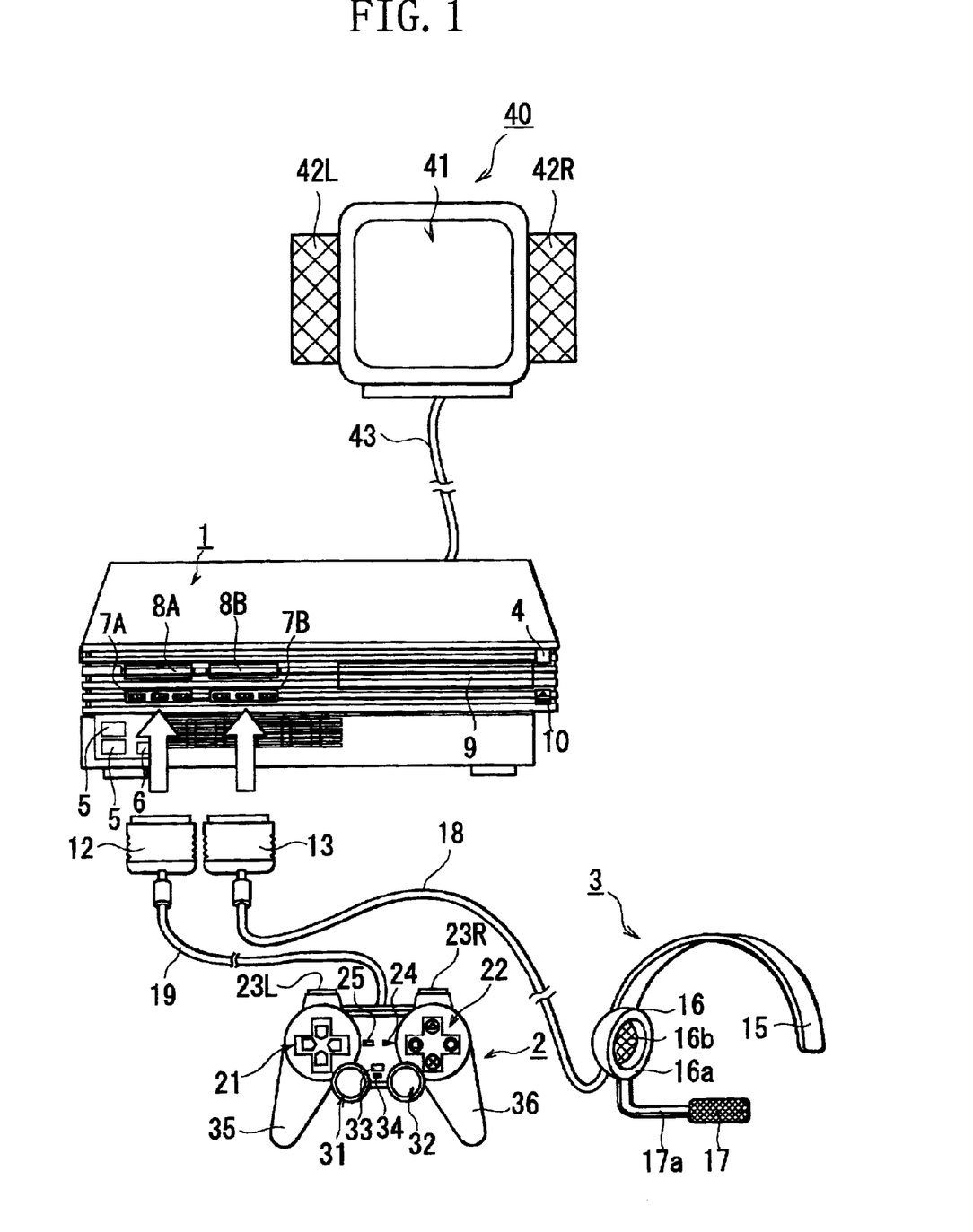
FIG. 1 is a perspective view of an entertainment device according to an embodiment of the present invention.

The present invention is applicable, for example, to an entertainment system as shown in FIG. 1.

General Constitution of Entertainment System

The entertainment system shown in FIG. 1 comprises a main unit 1 for executing a battle-type video game described later, a controller 2 for operating a character in the video game, a head set 3 for collecting player's voice to be transferred to the main unit 1 and for emitting characters' voices sent from the main unit 1, and a television receiver 40 including a display screen 41 for displaying game scenes of the video game and left and right speaker units 42R, 42L for emitting game sounds.

Constitution of Main Unit

The main unit 1 is provided with a reset button 4 for specifying reset of operations of such main unit 1, two USB (universal serial bus) connection terminals 5, an IEEE 1394 (Institute of Electrical and Electronics Engineers) connection terminal 6, controller ports 7A, 7B to which a controller 2 is connected, and memory card slots 8A, 8B allowing connection of the head set 3 and a memory card for storing details of the play up to a point of time the playing of the video game will be interrupted.

The main unit 1 is provided also with a disk tray 9 for loading onto the main unit 1 an optical disk 130 such as CD-ROM and DVD-ROM which stores, for example, a game program of the video game, sound information such as characters' voices and effective sounds, and music information such as a background music (BGM) of such video game; and an eject button 10 for specifying ejection of the optical disk 130 loaded onto the disk tray 9.

While not illustrated in the drawing, on the backside of the main unit 1, provided are a power switch, audio/video output terminal (AV multi-output terminal), a PC card slot, an optical digital output terminal, and an AC power input terminal. The television receiver 40 for monitoring is connected to the main unit 1 through the AV multi-output terminal, so as to allow game scenes of the video game to be displayed thereon, and to allow game sounds such as characters' voices, effective sounds and BGM to be audible from the left and right speaker units 42R, 42L.

Constitution of Controller

The controller 2 has a left grip end 35 held as being covered by the player's left palm; a right grip end 36 held as being covered by the player's right palm; left operational portion 21 and a right operational portion 22 operable by the individual thumbs of the left and right hands holding the grip ends 35, 36, respectively; a left analog operational portion 31 and a right analog operational portion 32 operable again by the left and right thumbs, respectively, in an analog manner (joy stick operation); a first left press button 23L and a first right press button 23R operable by the left and right first fingers, respectively; and a second left press button and a second right press button provided just below the first left press button 23L and the first right press button 23R, respectively, and operable by the left and right middle fingers, although not shown.

The left operational portion 21 is provided with "upward", "downward", "leftward" and "rightward" directional keys used by the player for moving for example a game character upward, downward, leftward or rightward. The "upward", "downward", "leftward" and "rightward" directional keys are also capable of specifying synthetic directions, so that pressing the "upward" directional key and the "rightward" directional key at the same time can issue an instruction for moving obliquely right upward. The same will apply to the other directional keys, and pressing, for example, the "downward" directional key and the "leftward" directional key at the same time can issue an instruction for moving obliquely left downward.

The right operational portion 22 is provided with four buttons ("Δ", "□", "x" and "○" buttons having thereon embossed markings of Δ, □, x and ○, respectively), which are assigned with functions, such as setting and execution of functions of game characters, differed by game application programs.

The left analog operational portion 31 and the right analog operational portion 32 are designed to keep upright posture (not-inclined posture) and remain in such position (referential position) when they are not inclined for operation, but when they are inclined for operation, a coordinate value on an X-Y coordinate is detected based on the amount and direction of the inclination from the referential position, and such coordinate value is supplied as an operational output to the main unit 1.

The controller 2 is also provided with a mode selection button 33 for toggling analog mode and digital mode, an illumination display portion 34 for informing, typically through illumination of LED (light emitting diode), the player of a current operational mode selected using such mode selection button 33, a start button 24 for prompting the game start, reproduction start and temporary stop, and a selection button 25 for issuing instruction for allowing the television receiver 40 to display thereon a menu or an operational panel.

When the analog operational mode is selected using the mode selection button 33, the illumination display portion 34 is controlled to light on to thereby activate the left and right analog operational portions 31, 32, and when the digital mode is selected, the illumination display portion 34 is controlled to turn off to thereby inactivate the left and right analog operational portions 31, 32.

In the left and right grip ends 35, 36, a motor having a weight decentered from the axis of rotation (vibration generation mechanism) is provided. Rotational operation of the motor is controlled based on an instruction from the main unit 1 when the game character gets some damage. This applies vibration to the player's hands holding the controller 2 to thereby enhance pleasure of the game play.

The controller 2 is connected to the main unit 1 by plugging a controller connection portion 12 into the controller port 7A or 7B, and can, upon receiving operation signals generated corresponding to operation of various buttons or operational portions by the player, send such operation signals to the main unit 1 through a cable 19, the controller connection portion 12 and the controller port 7A (or controller port 7B).

Constitution of Head Set

The head set 3 is typically designed for single-ear use, and has a fitting arm 15 for fitting the head set 3 onto the player's head, a sound emissive portion 16 provided at an end of the fitting arm 15 and is responsible for emitting characters' voices and effective sounds, and a microphone 17 for picking up the player's voice.

The fitting arm 15 is designed in a curved shape so as to fit the human head profile, and so as to lightly press both sides of the player's head with both ends thereof, to thereby attach the head set 3 onto the player's head.

The sound emissive portion 16 has a pad portion 16a which can cover the entire portion of the player's right (or left) ear when the head set 3 is fitted on the player's head, and a speaker unit 16b for emitting effective sounds and so forth of the video game. The pad portion 16a is composed, for example, of a soft material such as sponge so as to avoid pain on the player's ear caused by prolonged wearing of such head set 3.

The microphone 17 is provided on the end of a microphone arm 17a, the opposite end of which being attached to the sound emissive portion 16. The microphone 17 is designed to be positioned close to the player's mouth when the head set 3 is fitted on the player's head, which is convenient for picking up player's voice and supplying sound signals corresponding thereto through a cable 18 to the main unit 1.

The head set 3 is connected through the cable 18 and a head set connection portion 13 to the controller port 7A or 7B of the main unit 1, and is designed to send sound signals from the microphone 17 to the main unit 1 through such controller port 7A (or controller port 7B).

While the foregoing head set 3 is designed to be connected to the main unit 1 through the controller port 7A or 7B, it is also allowable to design such head set 3 so as to be connected to the main unit 1 through the memory card slot 8A or 8B, or further through the USB connection terminal 5 or IEEE 1394 connection terminal 6.

In short, any constitution is allowable provided that the head set 3 and the main unit 1 are connected with each other through an interface for supplying sound signals generated from the collected player's voice to the main unit 1, and an interface for supplying characters' voices or effective sounds from the main unit 1 to the head set 3.

Although the following explanation deals with the head set 3 designed for single-ear use, it should be noted that the binaural specification of such head set 3, like a general headphone, is also allowable. The sound emissive portion may have an inner-type earphone, which will be advantageous in reducing the size and weight of such head set.

It should also be noted that while the head set 3 herein is designed to be fitted on the player's head using the fitting arm 15, it is also allowable to provide a hook to be hung on either of the player's ears, to thereby allow the head set to be fixed on one side of the player's ear with the aid of such hook.

Electrical Constitution of Main Unit

Figure 2:
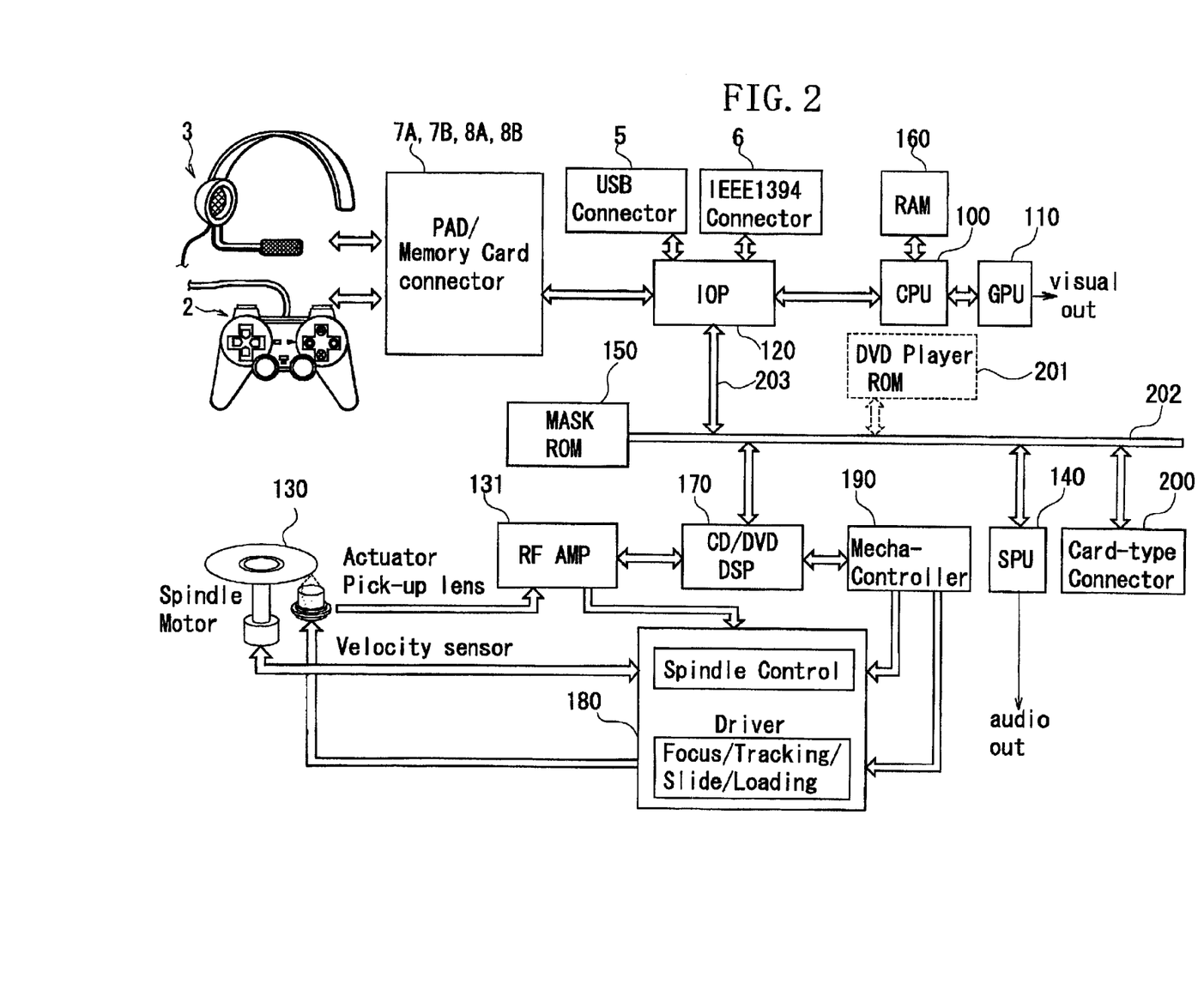
FIG. 2 is a block diagram of the entertainment device of the embodiment.

The main unit 1 has, as shown in FIG. 2, a CPU 100 for controlling signal processing or internal components based on various programs such as game application program, a graphic processor (GPU) 110 responsible for image processing, and an IO processor (IOP) 120 responsible for interfacing of an external device such as the controller 2 and memory card with an internal component within the main unit 1.

The main unit 1 also has a mechanical controller 190 responsible for reproducing and controlling an optical disk 130 such as DVD-ROM and CD-ROM which stores application programs or multi-media data, a main memory 160 having a function as buffer memory for temporarily storing data read out from a work area of the CPU 100 or the optical disk 130, a MASK-ROM 150 storing operating system programs to be executed mainly by the CPU 100 and IOP 120, and a sound processor unit 140 (SPU) responsible for sound signal processing.

The main unit 1 still also has a CD/DVD digital signal processor 170 (DSP) responsible for error correction processing (CIRC processing) of reproduction output from the optical disk 130 supplied via an RF amplifier 131, and responsible for expansion decoding of compressed coded data; a driver 180 and the mechanical controller 190 responsible for controlling rotation of a spindle motor, focusing/tracking of an optical pick-up, and loading operation of the disk tray 9; and a card-type connector 200 (PC card slot) for connecting a communication card or an external hard disk drive.

The individual portions are connected with each other mainly through bus lines 202, 203. The CPU 100 and the graphic processor 110 are connected through a dedicated bus line, and the CPU 100 and the IOP 120 are connected through a sub-bus line (SBUS). The IOP 120 and the CD/DVD digital signal processor 170, MASK-ROM 150, sound processor unit 140 and card-type connector 200 are also connected through the SBUS.

The CPU 100 controls the entire operations of the main unit 1 by executing the operating system program for the main CPU stored in the MASK-ROM 150. The CPU 100 is also designed to control operation of the video game on such main unit 1 through executing various application programs loaded onto the main memory 160 after read out from the optical disk 130 or downloaded from a communication network.

The IOP 120 executes the operating system program for the IOP stored in the MASK-ROM 150, to thereby enable input/output of signals sent from the controller 2 in response to the player's operation and data sent from the memory card storing various signals or game settings, input/output control of data at the USB connection terminals 5 and the IEEE 1394 connection terminal 6 and the PC card slot, and conversion of data protocol.

The MASK-ROM 150 is designed to store device IDs of the controller 2 connected to the controller ports 7A, 7B, head set 3, memory card inserted into the memory card slots 8A, 8B, and the PC card inserted into the card-type connector (PC card slot) 200. The IOP 120 communicates with various devices such as the controller 2 and memory card based on the device IDs thereof, to thereby specify external devices such as controller 2, head set 3, and memory card connected to the main unit 1.

The graphic processor 110 performs drawing based on draw instruction issued by the CPU 100, and drawn image is stored in a frame buffer not shown. The graphic processor 110 also has a function as a geometry transfer engine responsible for processing such as coordinate transfer.

That is, for the case that the application program of the video game or so stored in the optical disk 130 uses so-called three-dimensional (3D) graphic, the graphic processor 110, as a geometry transfer engine, constructs a virtual three-dimensional object with a set of triangle polygons, and then performs various calculations for generating an image possibly obtained by photographing such three-dimensional object with a virtual camera, that is perspective conversion for rendering (i.e., calculation of coordinate values of the vertexes of the individual polygons composing a three-dimensional image projected on to a virtual camera screen).

The graphic processor 110 performs rendering of the three-dimensional object on the frame buffer based on a drawing instruction from the CPU 100, while using if necessary the geometric transfer engine. The graphic processor 110 is so designed to output video signals corresponding to such generated image.

The sound processor unit 140 has an ADPCM decoding function for reproducing sound data which were processed by adaptive predictive coding, a reproducing function for reproducing and outputting effective sounds or the like by reproducing sound data stored in a sound buffer built in such unit 140 or externally attached thereto, and a modulation function for modulating and reproducing sound data stored in the sound buffer.

The sound processor unit 140 thus provided with such functions can be used as a so-called sampling sound source, which can generate sound signals such as those of music sounds and effective sounds from waveform data stored in the sound buffer based on instructions from the CPU 100.

Constitution of Sound Data

Figure 3:
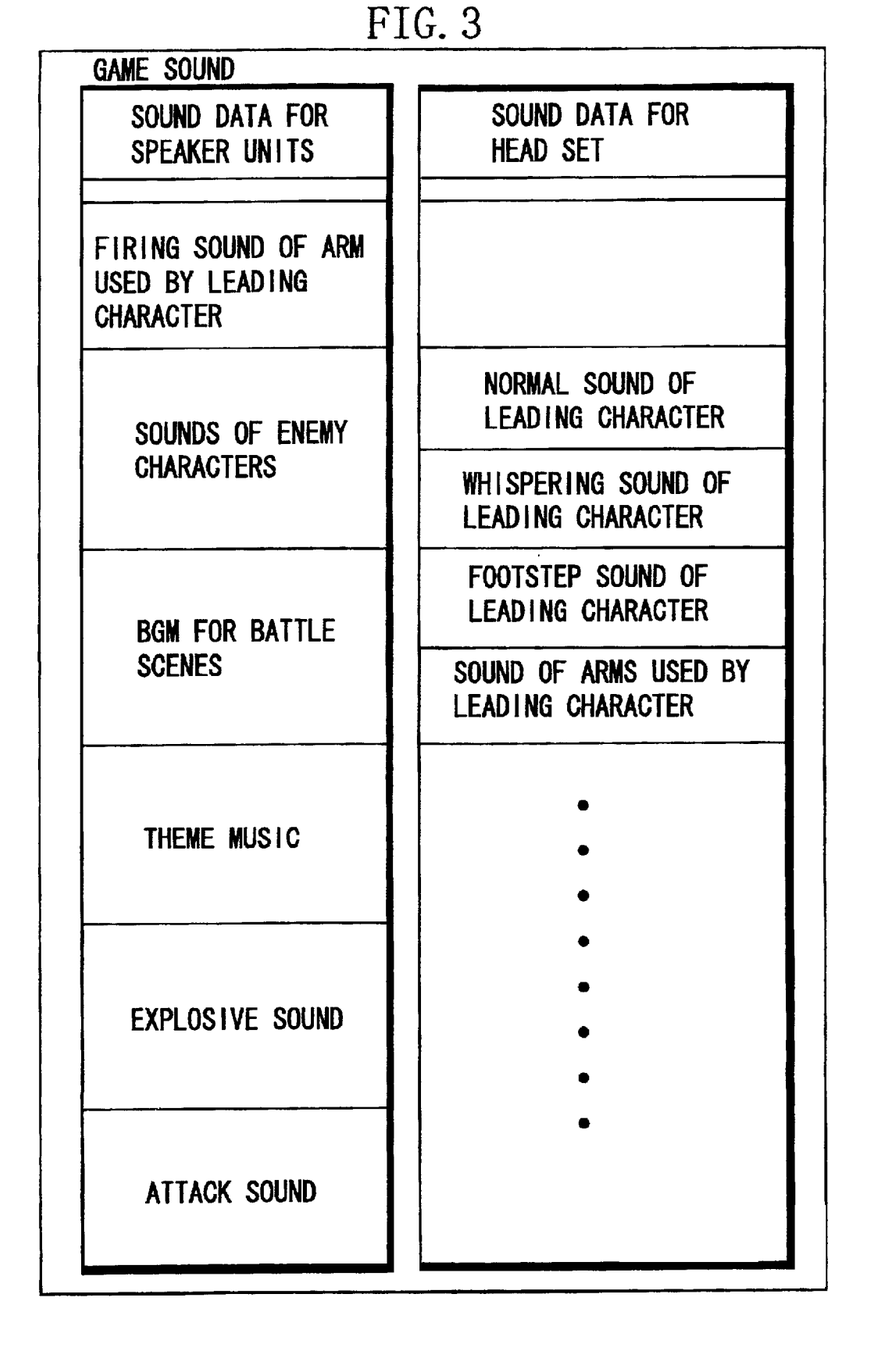
FIG. 3 is a schematic chart showing exemplary sound data of a video game run on the entertainment system of the embodiment.

FIG. 3 is a schematic chart showing an example of titles of waveform data read out from the optical disk 130 and then stored in the sound buffer of the sound processor unit 140. As is known from FIG. 3, the entertainment system of this embodiment characteristically has two sets of sound data, that are sound data for speaker unit to be emitted from the speaker unit 42R, 42L of the television receiver 40, and sound data for head set to be emitted from the head set 3 worn by the player.

The sound data for speaker unit are composed of sound data with relatively large sound levels, which typically include, as shown in FIG. 3, firing sound of the arms used by the leading character, shout of enemy characters, background music (BGM) for battle scenes, theme music, explosive sound and attack sound.

On the other hand, the sound data for head set are composed of sound data with relatively small sound levels, which typically include, as shown in FIG. 3, speech sound of the leading character at a normal sound level, whispering sound of the leading character, footstep sound of the leading character, sound of charging bullets to the arms by the leading character and sound of triggering.

While the foregoing example dealt with the case that sound data for head set includes those related to the leading character with relatively small sound levels, the sound data may include other data with a relatively small sound levels such as growling sound and footstep sound of the enemy characters.

In short, it is all right that the sound data for speaker unit and head set are classified so as to add reality and presence of the video game. One possible measure for adding perspective of sounds to thereby improve reality and presence of the video game relates to assessing whole sound data from a viewpoint that how loud the individual sounds are audible by the leading character, and classifying those having relatively large sound levels into those for speaker unit, and those having relatively small sound levels into those for head set.

Overall Executive Operation of Video Game

An entertainment device of this embodiment is designed to execute a battle-type video game described below.

In this battle-type video game, a leading character moves along a predetermined route, during which the leading character encounters with enemy characters. Thus the player operates the controller 2 and also speaks to the leading character in the displayed scene through the microphone 7 of the head set 3 to encourage it or make such leading character fight with enemy characters while giving instructions on the battle procedures. The player thus aims at the goal while defeating the enemy characters in such fights.

In the execution of such battle-type video game, the player turns on a main power source of the main unit 1. Upon supplying power to the main unit 1, the CPU 100 and the IOP 120 read out from the MASK-ROM 150 the operating system program for main CPU and operating system program for IOP, respectively, and by individually executing corresponding operating system programs, the CPU 100 generally controls the individual portions of the main unit 1, and the IOP 120 controls input/output of signals typically between the controller 2 or head set 3 and memory card.

Next, the player loads the optical disk 130 having stored therein such battle-type video game onto the main unit 1, and then presses the start button 24 of the controller 2 to prompt the game start.

When the game start is specified, the CPU 100 reads out an application program of the video game and the foregoing sound data stored in the optical disk 130, loads the application program and game sounds into the main memory 160 and the sound processor unit 140, respectively, and executes such application program.

While executing the game application program, the CPU 100 controls the graphic processor unit 110 and sound processor unit 140 in response to instructions of the players received via the IOP 120 from the controller 2 and head set 3, to thereby control display of the images and emission of the effective sounds and music sound (BGM).

The video game now allows the player not only to control the leading character through the controller 2, but also to control the leading character through voice input.

Figure 4:
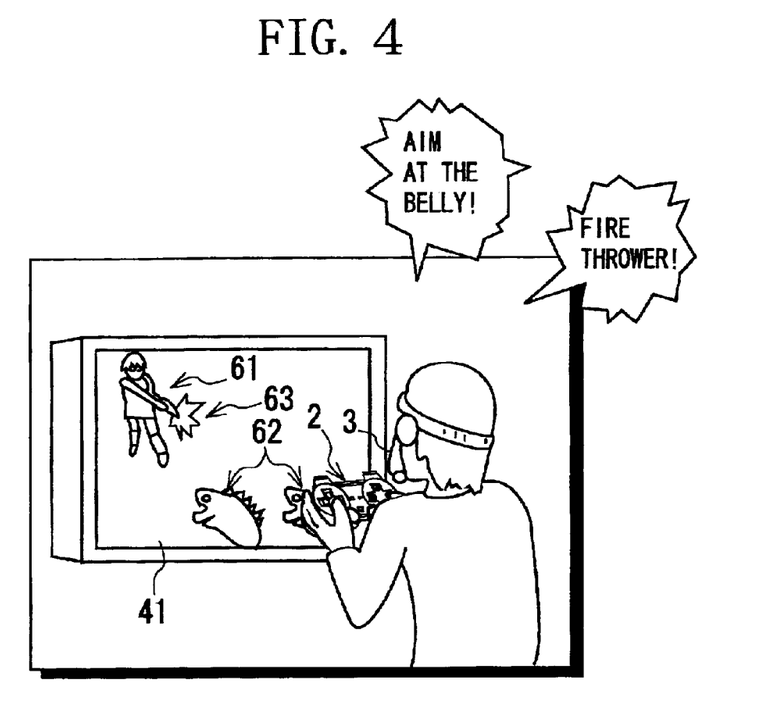
FIG. 4 is a schematic drawing showing a player playing a battle-type video game run on the entertainment system of the embodiment.

FIG. 4 shows one scene of such game, in which a leading character 61 encounters with an enemy character 62 during the travel along the travel route, and points arms 63, like a laser beam gun, at the enemy character 62.

In such exemplary case, in order to make an advantageous fight of the leading character 61 over the enemy character 62, the player not only controls the controller 2, but also gives instructions to the leading character 61 through voice such as "Fire thrower!" so as to designate the arms to be used for attacking the enemy character 62, and such as "Aim at the belly!" so as to designate a weak point of the enemy character 62 to be aimed at.

The player's voice is picked up by the microphone 17 of the head set 3, and then supplied via the IOP 120 to the CPU 100 after converted into sound signals. The CPU 100 analyzes meaning of the phrase spoken by the player based on waveform pattern of such sound signals, and controls display of behaviors of the leading character 61 based on the analytical results.

Figure 5:
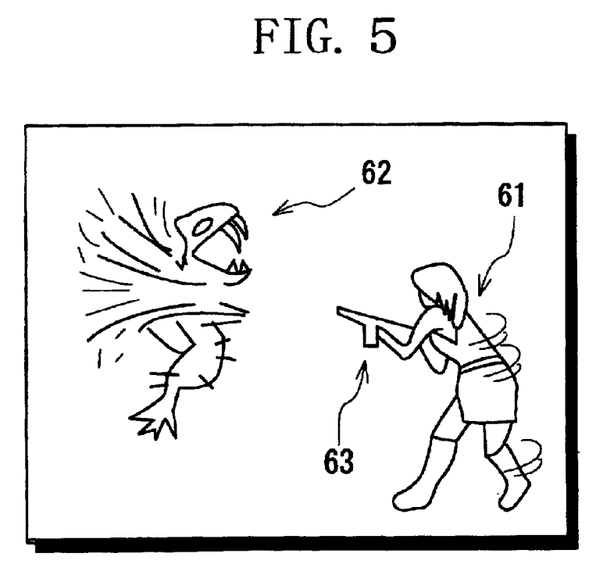
FIG. 5 is a schematic drawing of an exemplary game scene in which a leading character repulses an enemy character.

In such exemplary case, in which the instructions of "Fire thrower!" and "Aim at the belly!" were made by the player, the CPU 100 allows the controlled display as shown in FIG. 5 such that the leading character 61 holds a fire thrower as the arms 63 and throws fire to the enemy character 62 using such fire thrower to thereby expel it.

Sound Output Control

Figure 6:
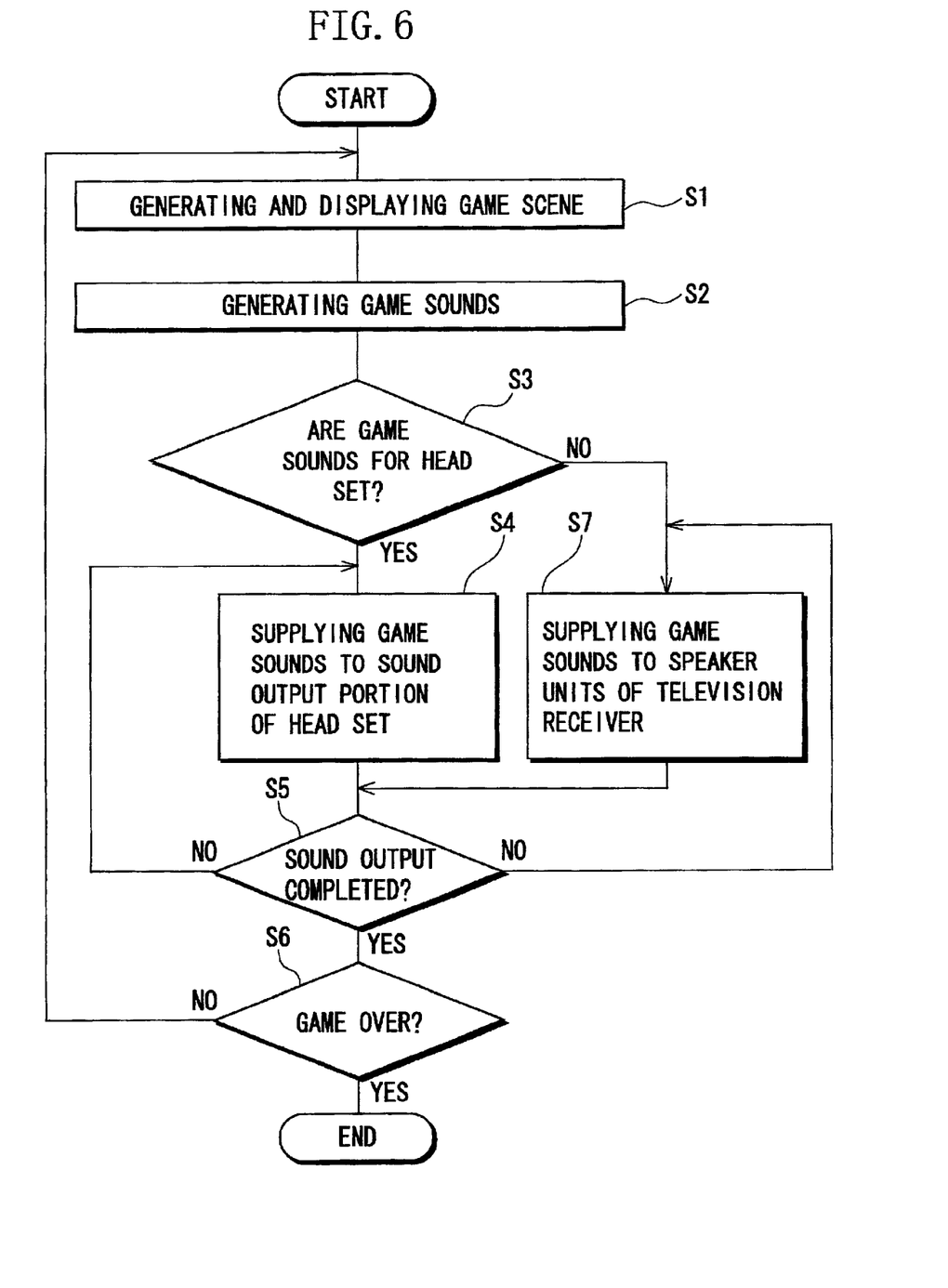
FIG. 6 is a flow chart showing a process flow of sound emission control executed on the entertainment system of the embodiment.

Next, sound output control specific to the entertainment system of this embodiment will be described. FIG. 6 is a flow chart showing a process flow of the sound output control. Processes in this flow chart starts upon beginning of the video game, and in step S1 the CPU 100 generates a game scene as shown in FIGS. 4 and 5, and creates controlled display thereof on the display screen 41 of the television receiver 40. Operation of the CPU 100 then advances to step S2.

In step S2, the CPU 100 controls the sound processor unit 140 so as to generate sounds corresponding to such game scene. The sound processor unit 140 generates sounds corresponding to such game scene based on the sound data (see FIG. 3) stored in the sound buffer, where the CPU 100 discriminates in step S3 whether the sounds generated by the sound processor unit 140 are those for head set 3 or not. If the sounds are found to be those for the head set 3 in step S3, process of the CPU 100 advances to step S4, and if for the speaker units 42R, 42L, to step S7.

When the process advances to step S4 after the sounds generated by the sound processor unit 140 are discriminated as those for the head set 3, the CPU 100 supplies such sound signals generated by the sound processor unit 140 to the sound emissive portion 16 of the head set 3 worn by the player via the IOP 120.

More specifically, the sound data for head set herein contain sounds data related to the leading character having relatively small sound levels as described in the above, which are typically speech sound of the leading character at a normal sound level, whispering sound of the leading character, footstep sound of the leading character, sound of charging bullets to the arms by the leading character and sound of triggering. So that supplying such sound signals to the head set 3 will result in emission of sounds, such as whispering of the leading character 61 corresponding to the game scene generated in step S1, from the sound emissive portion 16 of the head set 3.

On the other hand, when the process advances to step S7 after the sounds generated by the sound processor unit 140 are discriminated as those for the speaker units 42R, 42L, the CPU 100 supplies such sound signals generated by the sound processor unit 140 to the speaker units 42R, 42L of the television receiver 40.

More specifically, the sound data for speaker units herein contain sounds data having relatively large sound levels, which are typically firing sound of the arms used by the leading character, shout of enemy characters, background music (BGM) for battle scenes, theme music, explosive sound and attack sound. So that supplying such sound signals to the speaker units 42R, 42L will result in emission of sounds, such as shout of enemy characters corresponding to the game scene generated in step S1, from the speaker units 42R, 42L.

After such controlling of the game sounds, process of the CPU 100 then advances to step S5, and whether the output of a series of sound signals from the head set 3 or speaker units 42R, 42L has been completed is determined. If the output of the sound signals has not been completed, the process returns to step S4 or S7 in order to continue the supply of the sound signals to the head set 3 or the speaker units 42R, 42L.

On the other hand, when the output of a series of sound signals has been completed, the process of the CPU 100 advances to step S6, and whether the entire game program was completed, or whether the end of the game was instructed by the player is determined. When the game over was detected, the execution of the routine expressed by the flow chart of FIG. 6 is terminated, and when the game over was not detected, the process of the CPU 100 returns to step S1 in order to repeat the routine from steps S1 to S5 to thereby control the generation of the game scenes and emission of the game sounds. This allows repetitive generation of game scenes (step Sl) and game sounds corresponding thereto, which advances the battle-type video game.

Effect of the Embodiment

As is clear from the above description, the entertainment system of this embodiment classifies the game sounds into those for the left and right speaker units 42R, 42L of the television receiver 40, and those for the head set 3 worn by the player, and controls the emission of such sounds corresponding to the game scenes from the speaker units 42R, 42L, or from the sound emissive portion 16 of the head set 3.

This allows the player to enjoy the video game while hearing footstep or whispering of the leading character 61 closely from the head set 3, and hearing explosive sound or shout of the enemy characters 62 distantly from the speaker units 42R, 42L.

In other words, there are two types of game sounds, those emitted from the speaker units 42R, 42L provided distantly from the player, and those emitted from the sound emissive portion 16 of the head set 3 provided closely to the player, which successfully adds perspective to the game sounds, and improves reality and presence of the video game.

While the foregoing embodiment dealt with the case in which the head set 3 was used as the sound emissive means, it is also allowable to use a microphone for collecting the player's voice and a separate speaker unit provided close to the player, in place of the foregoing head set 3. Also such constitution can add perspective to the game sounds, and can ensure similar effects as described in the above.

Although particular embodiments have been described herein, it will be appreciated that the invention is not limited thereto and that many modifications and additions thereto may be made within the scope of the invention. For example, various combinations of the features of the following dependent claims can be made with the features of the independent claims without departing from the scope of the present invention.

What is claimed is:

1. A sound control device for a video game that manipulates a lead game character, comprising:
    a first sound output means provided at a predetermined distance from a player;
    a second sound output means provided close to a player's ear;
    a classifying means for classifying whole sounds related to the video game each into at least a first sound and a second sound; and
    a sound output control means for controlling output of the first sound through the first sound output means, and for controlling output of the second sound through the second sound output means, among sounds classified by the classifying means;
    wherein the classifying means classifies a sound having a sound level higher than a predetermined sound level as the first sound, and classifies a sound having a sound level lower than the predetermined sound level as the second sound, and wherein each sound level is determined as it would be perceived from a viewpoint of the lead game character.

2. The sound control device according to claim 1, wherein the sound output control means controls output of at least effective sound and a background music of the game as the first sound, and controls output of at least voice of a game character as the second sound.

3. The sound control device according to claim 1, wherein the second sound output means provided close to the player's ear is integrated with a sound collecting means for collecting the player's voice.

4. The sound control device according to claim 3, further comprising:
    analysis means for analyzing a meaning associated with the player's voice collected by the sound collecting means; and
    display control means for displaying a video game screen in a controlled manner according to the analyzed meaning.

5. The sound control device according to claim 3, wherein the sound collecting means is provided in a position that is close to the collecting player's mouth.

6. A sound control method for a video game that manipulates a lead game character, comprising the steps of:
    classifying by a classifying means whole sounds related to the video game each into at least a first sound and a second sound; and
    controlling output of the first sound through a first sound output means provided at a predetermined distance from a player and controlling output of the second sound through a second sound output means provided close to a player's ear, among sounds classified by the classifying means;
    wherein said classifying step classifies a sound having a sound level higher than a predetermined sound level as the first sound, and a sound level having a sound level lower than the predetermined sound level as the second sound, wherein each sound level is determined as it would be perceived from a viewpoint of the lead game character.

7. The sound control method according to claim 6, wherein the output controlling step comprises the steps of:
    controlling output of at least effective sound and a background music of the game as the first sound, and controlling output of at least voice of a game character as the second sound.

8. The sound control method according to claim 6, wherein the second sound output means provided close to the player's ear is integrated with a sound collecting means for collecting the player's voice.

9. A computer-readable storage medium having recorded therein a sound control program to be executed on a computer for a video game that manipulates a lead game character, wherein the sound control program comprises the steps of:
    classifying by a classifying means whole sounds related to the a video game each into at least a first sound and a second sound; and
    controlling output of the first sound through a first sound output means provided at a predetermined distance from a player and controlling output of the second sound through a second sound output means provided close to a player's ear, among sounds classified by the classifying means;

wherein said classifying step classifies a sound having a sound level higher than a predetermined sound level as the first sound, and a sound level having a sound level lower than the predetermined sound level as the second sound, wherein each sound level is determined as it would be perceived from a viewpoint of the lead game character.

10. The computer-readable storage medium having recorded therein a sound control program according to claim 9, wherein the output controlling step comprises the steps of:

controlling output of at least effective sound and a background music of the game as the first sound, and controlling output of at least voice of a game character as the second sound.

11. The computer-readable storage medium having recorded therein a sound control program according to claim 9, wherein the output controlling step through the second sound output means comprises the step of:

controlling output of the second sound through the second sound output means integrated with a sound collecting means for collecting the player's voice, said sound collecting means being provided close to the player's ear.

12. A program execution device for executing a sound control program for a video game that manipulates a lead game character, wherein the sound generation program comprises the steps of:

classifying by classifying means whole sounds related to the video game each into at least a first sound and a second sound; and controlling output of the first sound through a first sound output means provided at a predetermined distance from a player and controlling output of the second sound through a second sound output means provided close to a player's ear, among sounds classified by the classifying means;

wherein said classifying step classifies a sound having a sound level higher than a predetermined sound level as the first sound, and a sound level having a sound level lower than the predetermined sound level as the second sound, wherein each sound level is determined as it would be perceived from a viewpoint of the lead game character.

13. A sound control device for a video game that manipulates a lead character, comprising:

a first sound output unit provided at a predetermined distance from a player;

a second sound output unit provided close to a player's ear;

a classifying unit for classifying whole sounds related to the video game each into at least a first sound and a second sound; and a sound output control for controlling output of the first sound through the first sound output unit and for controlling output of the second sound through the second sound output unit, among sounds classified by the classifying unit;

wherein said classifying unit classifies a sound having a sound level higher than a predetermined sound level as the first sound, and a sound level having a sound level lower than the predetermined sound level as the second sound, wherein each sound level is determined as it would be perceived from a viewpoint of the lead game character.

* * * * *